(12) United States Patent
Ngo et al.

(10) Patent No.: US 11,115,734 B1
(45) Date of Patent: Sep. 7, 2021

(54) SPATIAL TRANSMIT/RECEIVE ISOLATION APPARATUS AND METHOD FOR OPTICAL COMMUNICATION SYSTEMS

(71) Applicant: Northrop Grumman Systems Corporation, Falls Church, VA (US)

(72) Inventors: Kiet D. Ngo, Hermosa Beach, CA (US); Donald G. Heflinger, Torrance, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 16/885,633

(22) Filed: May 28, 2020

(51) Int. Cl.
*H04B 10/50* (2013.01)
*H04Q 11/00* (2006.01)
*H04B 10/29* (2013.01)
*H04B 10/66* (2013.01)

(52) U.S. Cl.
CPC ......... *H04Q 11/0005* (2013.01); *H04B 10/29* (2013.01); *H04B 10/50* (2013.01); *H04B 10/66* (2013.01); *H04Q 2011/0016* (2013.01); *H04Q 2011/0026* (2013.01); *H04Q 2011/0035* (2013.01)

(58) Field of Classification Search
CPC ........ H04B 10/29; H04B 10/50; H04B 10/66; H04Q 11/0005
See application file for complete search history.

(56) References Cited

U.S. PATENT DOCUMENTS

| | | | | |
|---|---|---|---|---|
| 6,088,107 | A * | 7/2000 | Livingston | G01S 17/66 356/623 |
| 6,462,846 | B1 | 10/2002 | Delong | |
| 7,366,419 | B2 | 4/2008 | Ngo et al. | |
| 2002/0172253 | A1* | 11/2002 | Vetrovec | H01S 3/042 372/95 |
| 2006/0110163 | A1* | 5/2006 | Ngo | H04B 10/118 398/118 |
| 2018/0088280 | A1* | 3/2018 | Kim | G02B 6/29361 |

FOREIGN PATENT DOCUMENTS

EP 3516421 7/2019

OTHER PUBLICATIONS

International Search Report in related Application Serial No. PCT/US2021/020773, dated Jun. 10, 2021, 15 pages.

* cited by examiner

*Primary Examiner* — Dzung D Tran
(74) *Attorney, Agent, or Firm* — McCracken & Gillen LLC

(57) ABSTRACT

Apparatus for isolating transmit and receive optical beams having a common wavelength to ensure genderless interoperability in an optical communication system comprises a transmit path that propagates a transmit optical beam at a particular base wavelength and a receive path that propagates a receive optical beam at the same particular base wavelength wherein at least a portion of the receive path is separate from the transmit path. The apparatus further comprises an annular mirror having a receive beam region and a center aperture and the transmit path includes a steering mirror and the receive path also includes the steering mirror. The steering mirror has a single surface that reflects an entirety of the transmit optical beam transmitted along the transmit path and the single surface of the steering mirror reflects an entirety of the receive optical beam received along the receive path. A method of isolating transmit and receive optical beams in an optical communication system is also disclosed.

8 Claims, 3 Drawing Sheets

SPATIAL TRANSMIT/RECEIVE ISOLATION APPARATUS AND METHOD FOR OPTICAL COMMUNICATION SYSTEMS

BACKGROUND OF THE DISCLOSURE

1. Field of the Disclosure

The present subject matter relates generally to optical communication systems and, more particularly, to techniques for separating transmit and receive signals at an optical transceiver.

2. Description of the Background of the Disclosure

Known methods in optical communication terminals for separating and isolating transmit and receive signals include using different wavelengths or different polarization modes for the transmit and receive signals, referred to as wavelength diversity and polarization diversity, respectively. Another known technique uses time diversity to separate the signals, which is to say that the transmit and receive signals occupy different time slots and communication takes place in a simplex mode.

A critical element of the wavelength diversity approach is a dichroic beam splitter, the function of which is to reflect a receive beam but to pass a transmit beam or vice versa. The transmit beam passes through the dichroic beam splitter and proceeds along a transmission path. A receive beam is received over practically the same path and is reflected through a selected angle by the beam splitter. If the beam splitter is oriented at, say, 45° to the transmission path, the receive beam will be reflected through 90° and may then be conveniently processed in an optical receiver without interference with the transmit beam.

A similar separation of the two transmission paths can be effected by a polarization beam splitter, where the transmit beam is vertically polarized, for example, and the receive beam is horizontally polarized, but may be of the same wavelength as the transmit beam. The vertically polarized transmit beam passes through the polarization beam splitter and proceeds along the transmission path. The receive beam, being horizontally polarized, is reflected by the polarization beam splitter and provides the desired separation of the transmit and receive paths. Left- and right-handed circular polarizations can also be used with the addition of a quarter-wave plate to convert circular to linear polarization.

In a simplex communication link, an optical switch might be used to toggle back and forth between transmit and receive modes. In the transmit mode, the transmit beam passes through the optical switch and proceeds along the transmission path. In the receive mode, the receive beam enters the optical switch from the transmission path and is routed to the receive port while the transmit signal is routed to a dumped port. Once again, the transmit and receive signals may have the same wavelength.

All three of these prior art approaches for optical communication terminals have significant shortcomings. In order to obtain a high degree of isolation in the wavelength diversity approach, the dichroic beam splitter has to be designed to have many coating layers to effect the desired wavelength separation. Such a complex design is likely to have more insertion loss than a dichroic beam splitter of simpler design. Alternatively, the transmit and receive wavelengths may be selected to be widely spaced, but doing so may significantly limit the number of wavelengths that can be used within a limited optical amplifier bandwidth. The dichroic beam splitter may be designed with this trade-off between splitter complexity and wavelength separation in mind, but the wavelength diversity approach always requires some combination of design complexity and wide wavelength separation to produce a desirably high degree of isolation between the transmit and receive beams. A possible issue in using wavelength diversity arises from the fact that this approach requires that the receive wavelength and transmit wavelength be different, and that the receive and transmit wavelengths, along with the supporting wavelength selective optics, must be changed to enable any terminal to be interoperable with any other terminal. By using wavelength diversity, the terminal is effectively assigned a "gender" that requires pairing of terminals of the proper gender if the wavelengths cannot be changed due to increases in complexity and redundancy.

In the polarization isolation approach, the polarization beam splitter provides isolation performance of typically around 20 to 30 deciBels (dB), or 40 dB at best. The isolation required for ultra-long distance laser communication is, however, greater than 110 dB. Therefore, using polarization diversity for isolation also requires the use of other means to provide additional isolation. An in-fiber filter can typically provide an additional 60 dB of isolation, but this might not be sufficient for some applications. Depending where this filter is installed in relation to an optical low-noise amplifier, additional losses may be incurred as a result of the filter's use. Another drawback of polarization isolation is that photonics components using required polarization in space communications may be difficult to obtain and qualify for use.

Finally, the simplex approach is the most straightforward but, of course, has inherent limitations in comparison with a full duplex communication system. In addition, an optical switch approach provides around 50 dB of isolation. Other means of isolation will be required.

U.S. Pat. No. 7,366,419, owned by the assignee of the present application, discloses an apparatus and method for spatially isolating a transmit beam and a receive beam, which, in satellite communication systems, are inherently separated by a look ahead angle. A receive beam separation mirror is positioned in the receive beam path but out of the transmit beam path, and the receive beam is reflected along a path separated from the transmit beam path. The mirror may be annular, allowing the transmit beam to be directed through the center of the mirror. In applications where a desired isolation angle is different from the look ahead angle, or where there is no look ahead angle, the receive beam separation mirror is used in conjunction with a dichroic beam splitter and at least one receive beam steering mirror to achieve the desired angular separation.

SUMMARY

According to one embodiment, apparatus for isolating transmit and receive optical beams having a common wavelength to ensure genderless interoperability in an optical communication system comprises a transmit path that propagates a transmit optical beam at a particular base wavelength and a receive path that propagates a receive optical beam at the same particular base wavelength wherein at least a portion of the receive path is separate from the transmit path. The apparatus further comprises an annular mirror having a receive beam region and a center aperture and the transmit path includes a steering mirror and the receive path also includes the steering mirror. The steering mirror has a single surface that reflects an entirety of the transmit optical beam transmitted along the transmit path and the single surface of the steering mirror reflects an entirety of the receive optical beam received along the receive path.

According to another aspect, a method for isolating transmit and receive optical beams having a common wavelength to ensure genderless interoperability in an optical communication system comprises the steps of transmitting a transmit optical beam at a particular base wavelength along a transmit path and receiving a receive optical beam at the same particular base wavelength along a receive path wherein at least a portion of the receive path is separate from the transmit path. The method further comprises the steps of providing an annular mirror having a receive beam region and a center aperture, providing a steering mirror disposed in the transmit path and the receive path wherein the steering mirror has a single surface, and reflecting an entirety of the transmit optical beam transmitted along the transmit path and an entirety of the receive optical beam received along the receive path using the single surface of the steering mirror. The single surface of the steering mirror receives the transmit optical beam through the center aperture of the annular mirror and reflects the receive optical beam to the receive beam region and the steering mirror effects a desired degree of angular separation between the transmit optical beam and the receive optical beam.

Other aspects and advantages will become apparent from the following more detailed description, taken in conjunction with the accompanying drawings.

DETAILED DESCRIPTION

Figure 1:
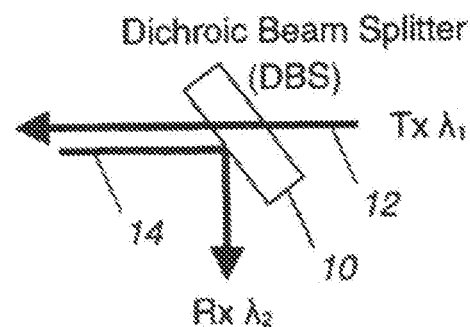
FIG. 1 is block diagram depicting the use of wavelength diversity for isolation of transmit and receive beams.
Figure 2:
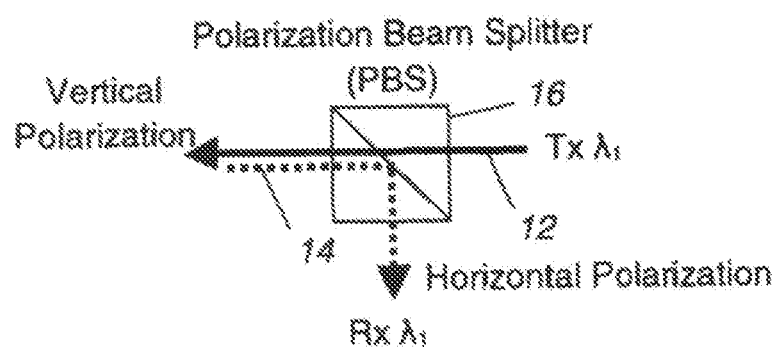
FIG. 2 is a block diagram depicting the use of polarization diversity for isolation of transmit and receive beams.
Figure 3:
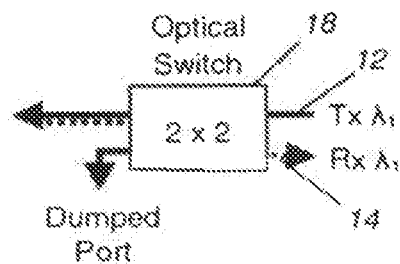
FIG. 3 is a block diagram depicting the use of a simplex communication link for isolation of transmit and receive beams.

As shown in the drawings for purposes of illustration, the present invention pertains to optical communication systems and to the need for an improved technique for isolating transmit and receive beams. FIG. 1 shows a dichroic beam splitter (DBS) 10 as used in prior art systems to isolate a transmit beam 12 at wavelength $\lambda_1$ from a receive beam 13 at wavelength $\lambda_2$. FIG. 2 shows the use of a polarization beam splitter (PBS) 16 for performing a similar function, when the transmit beam 12 and receive beam 14 may have the same wavelength. FIG. 3 shows the use of a 2×2 optical switch 18 to provide temporal separation of the transmit beam 12 and receive beam 14, in a simplex communication link. The drawbacks of these prior art techniques are discussed above in the background section of this specification.

Figure 4:
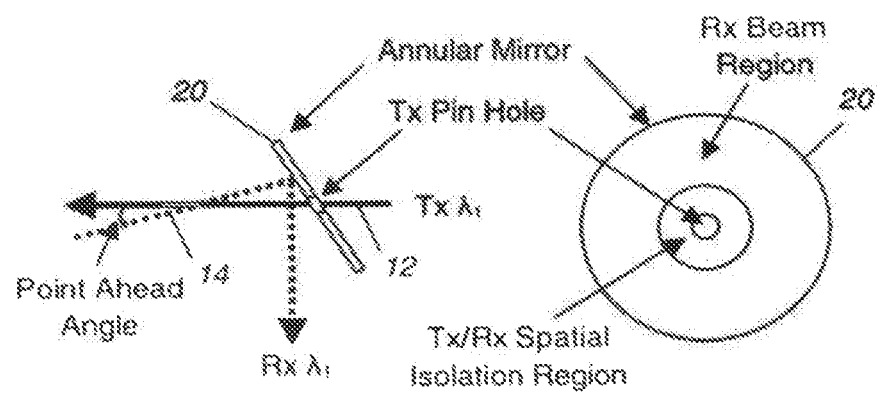
FIG. 4 is a generalized block diagram depicting the use of spatial separation to isolate transmit and receive beams in accordance with the present invention.

As seen in FIG. 4, the transmit beam 12 and receive beam 14 can be isolated spatially by taking advantage of a "point ahead" angle associated with most optical space communication systems. It is well known that in communicating with an orbiting satellite, a ground station must aim its transmit beam at a point in space in advance of the moving satellite. This is necessitated by the satellite's orbital velocity, which is greater than the velocity of the ground station. The speed of propagation of the communication beam is, of course, finite and requires aiming the transmit beam at the point ahead angle in advance of the satellite as it moves in its orbit. In effect, this phenomenon results in there being a small angular separation between the transmit beam 12 and the receive beam 14 at any instant in time. In the generalized block diagram of FIG. 4, in which the point ahead angle is exaggerated in magnitude for purposes of illustration, a mirror 20 may be positioned to separate the receive beam 14 without having any effect on the transmit beam 12. Specifically, if the mirror 20 is an annular one, it can be oriented and positioned such that the transmit beam 12 passes through the open center aperture of the mirror, while the receive beam 14 impinges on the annular receive-beam region of the mirror and is reflected through a desired angle for further processing in an optical receiver (not shown). Use of an annular mirror 20 has the additional advantage that the angle between the transmit beam 12 and the receive beam 14 may be quite small. Further, the annular mirror 20 may, for example, be sized to accommodate a transmit fiber core (or core and cladding) at its center aperture. More generally, the mirror 20 need not be angular, but may simply be a plane mirror positioned in the path of the receive beam 14 and out of the path of the transmit beam 12.

Figure 5:
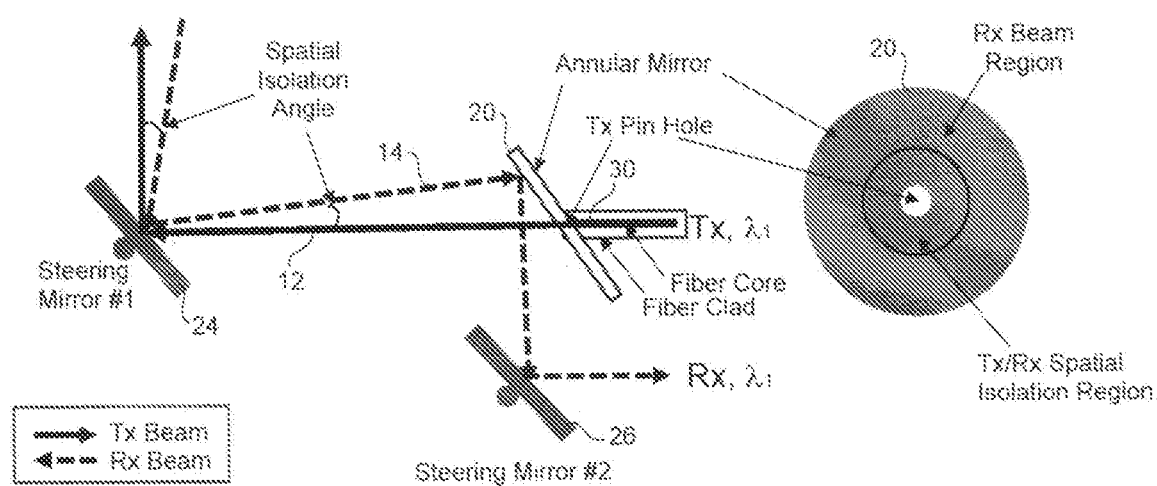
FIG. 5 is a detailed block diagram of a system that accomplishes spatial separation of the transmit and receive beams.

In the specific embodiment of FIG. 5, the transmit beam 12 and the receive beam 14 both have the same base wavelength $\lambda_1$, and hence, the communication methodology could be considered "genderless" in the sense that the transmit and receive systems are not differentiated according to wavelength. That is, while the particular communication methodology may involve frequency shifting or modulation, the transmit and receive functions nonetheless are operable in dependence on the same base wavelength. Also, the communication system is able to undertake duplex communication. First and second steering mirrors 24 and 26 provide control over the spatial separation angle between the transmit beam 12 and receive beam 14. The receive beam 14 is reflected from the first steering mirror 24 onto the annular mirror 20, from which it is further reflected to the second steering mirror 26. The steering mirrors 24 and 26 allow selection of a spatial isolation angle that can be greater than or less than the look ahead angle. The second beam steering mirror 26 typically directs the receive beam 14 into a receive fiber (not shown). In this configuration, the optical components are of relatively simple design with no requirement for polarization control. Alternatively, the second steering mirror 26 can be omitted and the optical components required for the receive function can be positioned appropriately.

INDUSTRIAL APPLICABILITY

The steering mirrors 24 and 26 provide a desired degree of isolation of the transmit beam 12 and receive beam 14. As noted with reference to FIG. 4, the mirror 20 is preferably annular in shape to facilitate coupling to a transmit fiber 30 (FIG. 5), but the embodiment is not limited to the use of an annular configuration for the mirror 20.

It will be appreciated from the foregoing that the present embodiment provides a simple but effective approach for isolation of transmit and receive beams in an optical communication system that enables genderless terminal interoperability using a common base wavelength for both transmit and receive signals, thereby enabling any terminal to communicate with any other. In particular, the illustrated embodiment provides spatial separation of the transmit and receive beams having a common wavelength enabling genderless interoperability without the need for polarization optics or dichroic optics.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. Apparatus for isolating transmit and receive optical beams having a common wavelength to ensure genderless interoperability in an optical communication system, comprising:
    a transmit path that propagates a transmit optical beam at a particular base wavelength;
    a receive path that propagates a receive optical beam at the same particular base wavelength wherein at least a portion of the receive path is separate from the transmit path; and
    an annular mirror having a receive beam region and a center aperture;
    wherein the transmit path includes a steering mirror and the receive path also includes the steering mirror wherein the steering mirror has a single surface that reflects an entirety of the transmit optical beam transmitted along the transmit path and the single surface of the steering mirror reflects an entirety of the receive optical beam received along the receive path;
    wherein the steering mirror receives the transmit optical beam through the center aperture of the annular mirror and reflects the receive optical beam to the receive beam region;
    wherein the steering mirror effects a desired degree of angular separation between the transmit optical beam and the receive optical beam.

2. Apparatus as defined in claim 1, wherein:
    the optical communication system communicates with an orbiting satellite; and
    the receive path and transmit path are separated by a look ahead angle.

3. Apparatus as defined in claim 2, wherein the desired degree of angular separation between the transmit optical beam and the receive optical beam is equal to the look ahead angle.

4. Apparatus as defined in claim 1, and further comprising a further steering mirror, oriented and located to receive the receive optical beam from the receive beam region of the annular mirror and to reflect the receive optical beam along a desired path.

5. A method for isolating transmit and receive optical beams having a common wavelength to ensure genderless interoperability in an optical communication system, the method comprising the steps of:
    transmitting a transmit optical beam at a particular base wavelength along a transmit path;
    receiving a receive optical beam at the same particular base wavelength along a receive path wherein at least a portion of the receive path is separate from the transmit path; and
    providing an annular mirror having a receive beam region and a center aperture;
    providing a steering mirror disposed in the transmit path and the receive path wherein the steering mirror has a single surface; and
    reflecting an entirety of the transmit optical beam transmitted along the transmit path and an entirety of the receive optical beam received along the receive path using the single surface of the steering mirror;
    wherein the single surface of the steering mirror receives the transmit optical beam through the center aperture of the annular mirror and reflects the receive optical beam to the receive beam region; and
    wherein the steering mirror effects a desired degree of angular separation between the transmit optical beam and the receive optical beam.

6. A method as defined in claim 5, wherein:
    the optical communication system communicates with an orbiting satellite; and
    the receive path and transmit path are separated by a look ahead angle.

7. A method as defined in claim 6, and further comprising the step of providing a further steering mirror to reflect the receive optical beam along a desired path after reflection from the receive beam region.

8. A method as defined in claim 5, wherein the step of providing the steering mirror comprises the step of orienting and positioning the steering mirror such that the desired degree of angular separation between the transmit optical beam and the receive optical beam is equal to the look ahead angle.

* * * * *